(12) United States Patent
Przytula et al.

(10) Patent No.: US 8,438,129 B1
(45) Date of Patent: May 7, 2013

(54) PROBABILISTIC IMPLEMENTATION OF SYSTEM HEALTH PROGNOSIS

(75) Inventors: Krzysztof Wojtek Przytula, Santa Monica, CA (US); Arthur Choi, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 415 days.

(21) Appl. No.: 12/783,299

(22) Filed: May 19, 2010

(51) Int. Cl.
*G06F 9/44* (2006.01)
*G06N 7/02* (2006.01)
*G06N 7/06* (2006.01)

(52) U.S. Cl.
USPC .......................................................... 706/52

(58) Field of Classification Search ............ 706/52
See application file for complete search history.

(56) References Cited

U.S. PATENT DOCUMENTS

| | | | | |
|---|---|---|---|---|
| 5,832,291 | A * | 11/1998 | Rosen et al. ............ | 712/11 |
| 7,146,356 | B2 * | 12/2006 | Choi et al. .............. | 707/706 |
| 7,149,649 | B2 * | 12/2006 | Haft et al. .............. | 702/179 |
| 7,158,958 | B2 * | 1/2007 | Przytula et al. .......... | 706/45 |
| 7,272,587 | B1 * | 9/2007 | Przytula ................ | 706/52 |
| 7,328,200 | B2 * | 2/2008 | Przytula ................ | 706/52 |
| 7,437,349 | B2 * | 10/2008 | Basu et al. .............. | 1/1 |
| 7,577,548 | B1 * | 8/2009 | Przytula et al. .......... | 702/182 |
| 7,630,947 | B2 * | 12/2009 | Pandya et al. ........... | 706/45 |
| 7,650,272 | B2 * | 1/2010 | Przytula et al. .......... | 703/20 |
| 7,698,055 | B2 * | 4/2010 | Horvitz et al. .......... | 701/117 |
| 7,739,213 | B1 * | 6/2010 | Przytula et al. .......... | 706/46 |
| 7,840,512 | B2 * | 11/2010 | Pandya et al. ........... | 706/45 |
| 7,925,995 | B2 * | 4/2011 | Krumm et al. ........... | 715/855 |
| 8,156,069 | B2 * | 4/2012 | Allen et al. ............ | 706/52 |

OTHER PUBLICATIONS

S. Engel, et al., "Prognostics, real issues involved with predicting life remaining," Proc. IEEE Aerospace Conf. 2000.
G. Provan, "An open systems architecture for prognostic inference during condition-based monitoring," Aerospace Conference 2003.
C.S. Byington, et al., "Prognostic enhancements to gas turbine diagnostic systems," Proc. of IEEE Aerospace Conference 2003.
T. Brotherton. et al., "eSTORM: Enhanced self tuning on-board real-time engine model," Aerospace Conference 2003.
S.W. Wederich, "Nonparametric modeling of vibration: signal features for equipment health monitoring."
K. Wojtek Przytula, Arthur Choi, "Reasoning Framework for Diagnosis and Prognosis," IEEE Aerospace Conference, 2007.
K. Wojtek Przytula, et al., "Evaluation of Bayesian Networks Used for Diagnostics," Aerospace Conference, 2003. Proceedings. 2003 IEEE, vol. 7, pp. 3177-3187.
K. Wojtek Przytula, et al., "Collaborative development of large Bayesian networks," in Proc. IEEE Autotestcon, 2006, pp. 515-522.

* cited by examiner

*Primary Examiner* — Michael B Holmes
(74) *Attorney, Agent, or Firm* — Tope-McKay & Associates

(57) ABSTRACT

Described is a system for health prognosis of a component based on the use of a graphical probabilistic model. The model comprises a layer of at least one component node representing the health of a component, a layer of at least one health observation node representing a health observation, and a layer of at least one usage node representing a usage observation. Additionally, the system is configured to collect component failure data, which is used in generating normalized failure histograms. The histograms provide failure densities for component and health observation failures. The system also computes at least one parameter for the model using component and health observation failure densities. A component prognosis is computed based on present observation of system usage and health with a history of past observation using a standard reasoning engine.

21 Claims, 8 Drawing Sheets

PROBABILISTIC IMPLEMENTATION OF SYSTEM HEALTH PROGNOSIS

BACKGROUND OF THE INVENTION (1) Field of Invention

The present invention relates to a system for health prognosis of a component and, more particularly, to a system for health prognosis of a component based on a structured Bayesian network model which utilizes domain knowledge and system performance data.

(2) Description of Related Art

Current prognosis solutions are limited to individual components or simple subsystems (e.g., bearings, turbine disks, electric motors, and batteries). The reasoning in these systems is customized to the application and often based on simple heuristics.

For instance, in "Prognostics, Real Issues Involved with Predicting Life Remaining," by S. Engel et al. in Proceedings of the IEEE Aerospace Conference, 2000, a tutorial describing in general terms a prognosis problem is presented. Engel et al. propose a prognosis within a probabilistic framework and defines key issues involved in applying probabilistic approaches to prognosis. The reference is theoretical in nature and does not provide specific solutions or algorithms.

Additionally, "An Open Systems Architecture for Prognostic Inference during Condition-Based Monitoring," by G. Provan, in Proc. of the IEEE Aerospace Conference, 2003, describes an open systems architecture representation that is critical to any analysis of prognosis by specifying a generic prognosis module, the inputs and outputs to it, measures of remaining useful life, and the importance of how a component will be used. However, the reference is unclear regarding the details of the various components of its architecture. In particular, Provan does not provide any insight into the exact nature of how the observations will be integrated into a prognostic framework.

There are several solutions proposed in the literature that focus on applying the general framework for a particular application and developing prognostic solutions for specific subsystems. The first reference described below belongs to the former category, while the following two references belong to the latter category.

In "Prognostic Enhancements to Gas Turbine Diagnostic systems," by C. S. Byington, et al. in Proc. of the IEEE Aerospace Conference, 2003, the authors apply a general framework to a specific application for gas turbine engine diagnosis.

"eSTORM: Enhanced Self Tuning On-board Real-Time Engine Model," by T. Brotherton, et al. in Proc. of the IEEE Aerospace Conference, 2003, discloses a method for on-line diagnostics and prognostics. Brotherton, et al. upgrade a physics-based model called STORM with an empirical neural network, such that modeling errors during on-line functions are mitigated. The model is for an aircraft engine, and the results are specific for the aircraft engine. Brotherton, et al. focus on a narrow aspect of trending for a subsystem and do not address the crucial aspect of how various components for prognosis can be integrated into a single framework.

In "Nonparametric Modeling of Vibration Signal Features for Equipment Health Monitoring" in Proc. of the IEEE Aerospace Conference, 2003, S. W. Wegerich describes a method for modeling vibrations of systems from data. The reference also provides a method for evaluating if the vibrations are predictive of impending failures and provides an approach to the computation of the Useful Life Remaining of equipment based on the residual errors computed from the vibration characteristics. The reference is very narrow in that it models a specific component of a subsystem.

Thus, a continuing need exists for a systematic, application-independent approach to prognosis which is mathematically rigorous, efficient, and accurate.

SUMMARY OF THE INVENTION

The present invention relates to a system for health prognosis of a component using a graphical probabilistic model. The system comprises one or more processors that are operable for performing operations of utilizing a graphical probabilistic model. The graphical probabilistic model comprises a first layer having at least one component node representing the health of at least one component. A second layer is included that has at least one health observation node representing at least one health observation. Additionally, a third layer having at least one usage node representing at least one usage observation is included in the model. The system also performs operations of collecting component failure data and generating normalized histograms of failures with a set of usage bins and a set of health bins. The histograms provide failure densities for component and health observation failures. Furthermore, the system computes at least one parameter for the model using component and health observation future densities. A component prognosis is also computed using a reasoning engine. Finally, a component health prognosis is computed and output.

In another aspect, the third layer is connected with the first layer, and the second layer is connected with the first layer, wherein nodes in different layers are connected to one another through causal links.

In another aspect, each component node has a defective state and an OK state, each usage node has a state for each usage bin, and each health observation node has a state for each health bin.

In yet another aspect, the usage bins correspond to n component usages $u_1, \ldots, u_n$, and the health bins correspond to in health observation states $o_1, \ldots, o_m$, wherein a component usage histogram induces a failure density $\{fu_i\}_{i=1}^n$, and a health observation histogram induces a failure density $\{fo_k\}_{k=1}^m$, such that $fu_i$ and $fo_k$ are histogram values for bins $u_1$ and $o_k$, respectively.

In another aspect, wherein a set of usage nodes $U_{i_q}$ take on a set of usage values $u_0, u_1, \ldots, u_n$, such that $i_q$ is some usage bin from 0 to n; and wherein a set of component nodes $C_{i_q}$ represents the health of the component at usage $u_{i_q}$, where each $C_{i_q}$ has two states $c_{def}$ and $c_{ok}$, such that a value assignment $C_{i_q} = c_{def}$ denotes an event that the component is defective at a usage $u_{i_q}$ and $C_{i_q} = c_{ok}$ denotes an event that the component is healthy at usage $u_{i_q}$; and wherein a set of health observation nodes $O_{i_q}$ take on a set of health observation values $o_1, \ldots, o_n$, where each $O_{i_q}$ represents a health observation at usage $u_{i_q}$.

In another aspect, wherein in the act of computing at least one parameter for the model, the system is further configured to perform operations of: assuming that each usage node $U_{i_q}$ will be fixed to some value $u_{i_q}$ during reasoning, where a prior probability distribution over the states of the usage nodes is uniform; specifying a set of parameters for the set of component nodes $C_{i_q}$, wherein the parameters are defined using the failure density $\{fu_i\}_{i=1}^n$ from the component usage histogram according to the following:

$$Pr(C_{i_0} = c_{ok} | U_{i_0} = u_{i_0}) = 1$$

$$Pr(C_{i_0} = c_{def} | U_{i_0} = u_{i_0}) = 0.$$

where Pr denotes a probability distribution, | denotes a conditional probability, and where $i_0$ denotes a usage corresponding to a latest usage where the component is known to be healthy; computing a set of conditional probabilities for a set of component nodes $C_{i_q}$ using values obtained from the histogram bins according to the following:

$$Pr\left(C_{i_q} = c_{def} \mid C_{i_{q-1}} = c_{ok}, U_{i_{q-1}} = u_{i_{q-1}}, U_{i_q} = u_{i_q}\right) = \frac{\sum_{k=i_{q-1}+1}^{i_q} fu_k}{\sum_{k=i_{q-1}+1}^{n} fu_k},$$

given that the component is healthy at usage $u_{i_{q-1}}$; specifying a set of parameters for a set of health observation nodes $O_{i_q}$, wherein the parameters are defined using the failure density $\{fo_k\}_{k=1}^{m}$ from the health observation histogram according to the following conditional probabilities:

$$Pr(O_{i_q}=o_k|C_{i_q}=c_{def})=fo_k;\text{ and}$$

$$Pr(O_{i_q}=o_k|C_{i_q}=c_{ok})=\alpha Ro_{k+1},$$

where $R_{o_{k+1}} = \sum_{l=k+1}^{m} fo_l$ is a reliability of the observation at state $o_k$, where $R_{o_{m+1}}=0$, and where $\alpha = (\sum_{k+1}^{m} Ro_{k+1})^{-1}$ is a normalizing constant.

In another aspect, in the operation of computing a component prognosis using a reasoning engine, the system is further configured to perform operations of identifying a latest usage $u_{i_q}$ in which the component is known to be healthy; collecting a history of health observations $(O_{i_1}, \ldots, O_{i_q}) = (o_{i_1}, \ldots, o_{i_q})$ with a corresponding set of usages $(U_{i_1}, \ldots, U_{i_q}) = (u_{i_1}, \ldots, u_{i_q})$ that identify when the observations were made; selecting a present usage $u_j$, where $j > i_q$ and a present observation for node $O_j$; computing a marginal probability of component $C_j$, given all assignments for a diagnosis; selecting a future usage $u_k$, where $k > j$; and computing a marginal probability over component $C_k$, given preceding assignments for a prognosis.

As can be appreciated by one in the art, the present invention also comprises a method for causing a processor to perform the operations described herein.

Finally, the present invention also comprises a computer program product comprising computer-readable instruction means stored on a computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
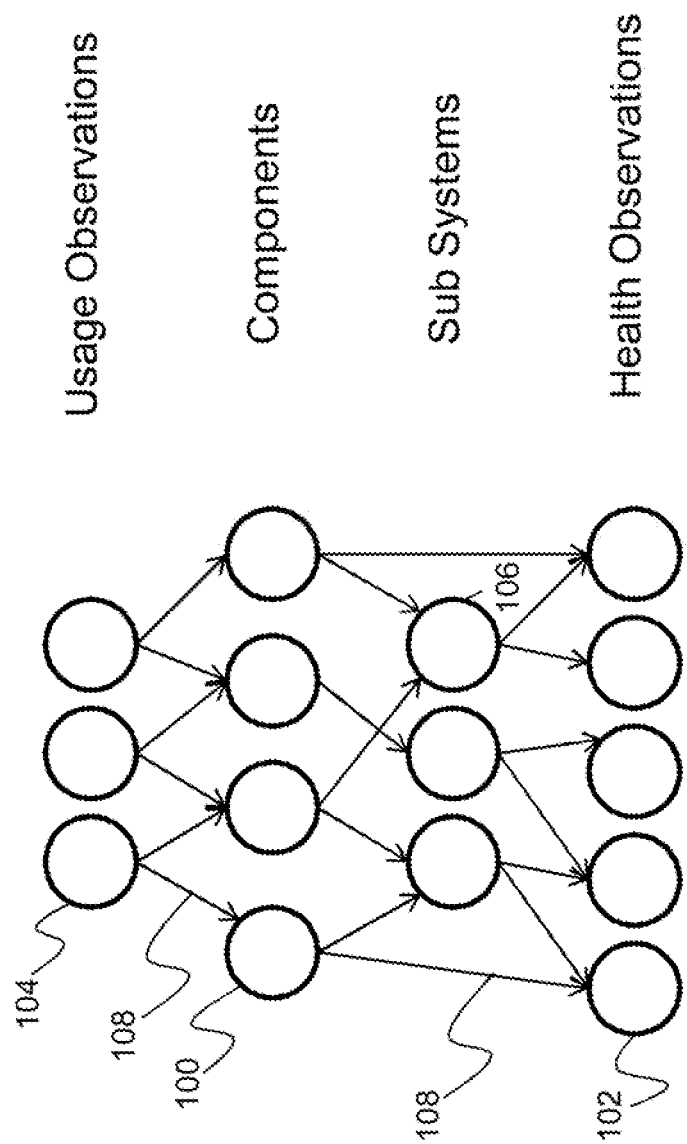
FIG. 1 illustrates a graphical model of a structured Bayesian network according to the present invention.

The present invention relates to a system for health prognosis of a component and, more particularly, to a system for health prognosis of a component based on a structured Bayesian network (BN) model, which is created from domain knowledge and system performance data. The following description is presented to enable one of ordinary skill in the art to make and use the invention and to incorporate it in the context of particular applications of health prognosis. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Glossary

Before describing the specific details of the present invention, a glossary is provided in which various terms used herein and in the claims are defined. The glossary provided is intended to provide the reader with a general understanding of the intended meaning of the terms, but is not intended to convey the entire scope of each term. Rather, the glossary is intended to supplement the rest of the specification in more accurately explaining the terms used.

Component—The term "component" as used with respect to the present invention generally refers to system or subsystem that is operable in performing a future mission and which is subject to usage in performing the future mission.

Future Mission—The term "future mission" as used with respect to the present invention generally refers to a predetermined task that is performed using the component. The future mission can be defined in terms of future usage of the component in completing the future mission, as applied to the usage variable.

Instruction Means—The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a computer-readable medium such as a floppy disk, a CD-ROM, and a flash drive.

Usage—The term "usage" refers to the amount of usage of a component. The amount of usage of a component can be measured in multiple variables, non-limiting examples of which include time, repetitions, cycles, distance, etc.

Usage Variable—The term "usage variable" refers to a variable that is indicative of usage of a component. The observation of usage for a given component is a value of its usage variable(s). Usage variable of a given component is a variable best representing the component's use (e.g., for a tire it may be miles, for an engine, hours of operation and, for a valve, number of cycles of operation).

(2) Principal Aspects

The present invention has three "principal" aspects. The first is a system for health prognosis of a component. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for health prognosis of a component, typically in the form of software, operated using a data processing system (computer or computer network). The third principal aspect is a computer program product. The computer program product generally represents computer-readable instruction means stored on a computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

(3) Specific Details

The present invention will be described in three sections. First, described is a structured, dynamic Bayesian network model for prognosis and its development. Second, the use of the model in the computation of prognosis will be presented. Third, algorithms for the derivation of the Bayesian network model parameters from simple failure histograms will be described.

(3.1) Structured Bayesian Network Model for Prognosis

The present invention relates to a system for health prognosis of a component based on a structured Bayesian network model which is developed using domain knowledge and system performance data. The graphical probabilistic models used in the approach are a form of structured, dynamic Bayesian networks, which are based on layered, directed graphs.

FIG. 1 illustrates a diagnostic graphical model of a structured Bayesian network. As shown, there is a layer of component nodes 100 representing the health of components, a layer of health observation nodes 102 representing health observations, a layer of usage nodes representing usage observations 104 and, if the grouping of nodes is beneficial, one or more layers of subsystems 106. The nodes in different layers 100, 102, 104, and 106 of the network are connected to each other by causal links 108, but there are no direct connections between nodes inside a given layer. There are links 108 from the usage layer 104 to the component layer 100 and links 108 from the component 100 layer to the health layer 102. If the grouping of nodes is beneficial, causal links may connect the component layer 100 to the subsystems layer 106 and the subsystems layer 106 to the health layer 102.

Figure 2:
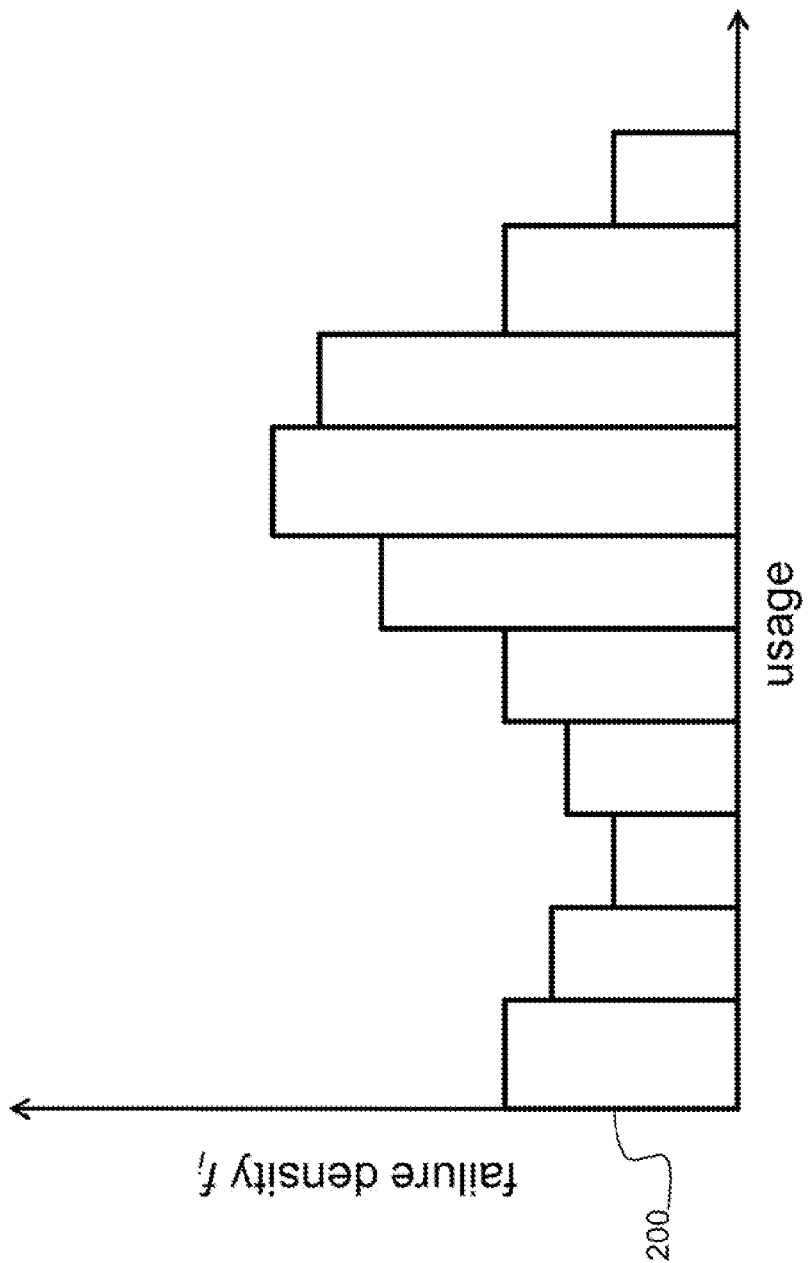
FIG. 2 illustrates a normalized histogram of component failures as a function of usage according to the present invention.
Figure 3:
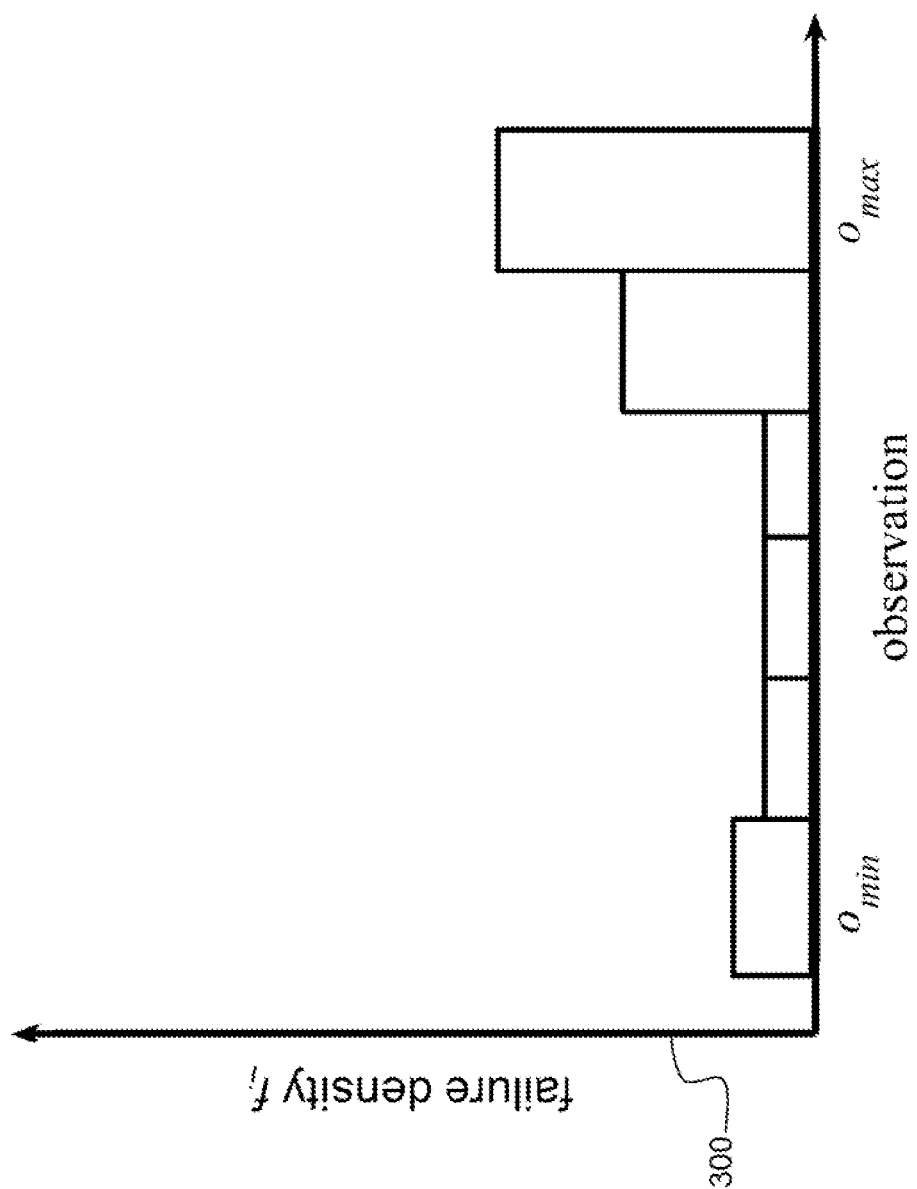
FIG. 3 illustrates a normalized histogram of component failures as a function of health observations according to the present invention.

The Bayesian network graphs are annotated by parameters in the form of conditional probabilities. The layered structure reduces the number of parameters needed to completely define the Bayesian networks, compared to the number needed in unstructured networks. The present invention includes a method for deriving the parameters from histograms of component failures, which will be described in further detail below. FIG. 2 illustrates a normalized histogram of component failures as a function of usage 200. A normalized histogram of component failures as a function of health observations 300 is depicted in FIG. 3. In the present application, the bin size of the measurement histograms determine the accuracy of the prediction.

The data for these histograms can be obtained from a variety of sources, non-limiting examples of which include manufacturer's specifications, test-bench experiments, simulations, and field data. To obtain a highly reliable model, a combination of sources of data is typically necessary. Details of how to simulate the system to produce the histogram is available in the literature. Although described as a histogram, any suitable chart (or categorizing and/or graphing method) can be used to accomplish the same result. As can be appreciated by one skilled in the art, the histogram is described herein as having bins to catalog (categorize) data, however, other suitable techniques such as tables and graphs can be used interchangeably herewith. Thus, although the claims describe a histogram having bins, they are not intended to be limited thereto as other equivalent techniques can be used interchangeably therein.

Figure 4:
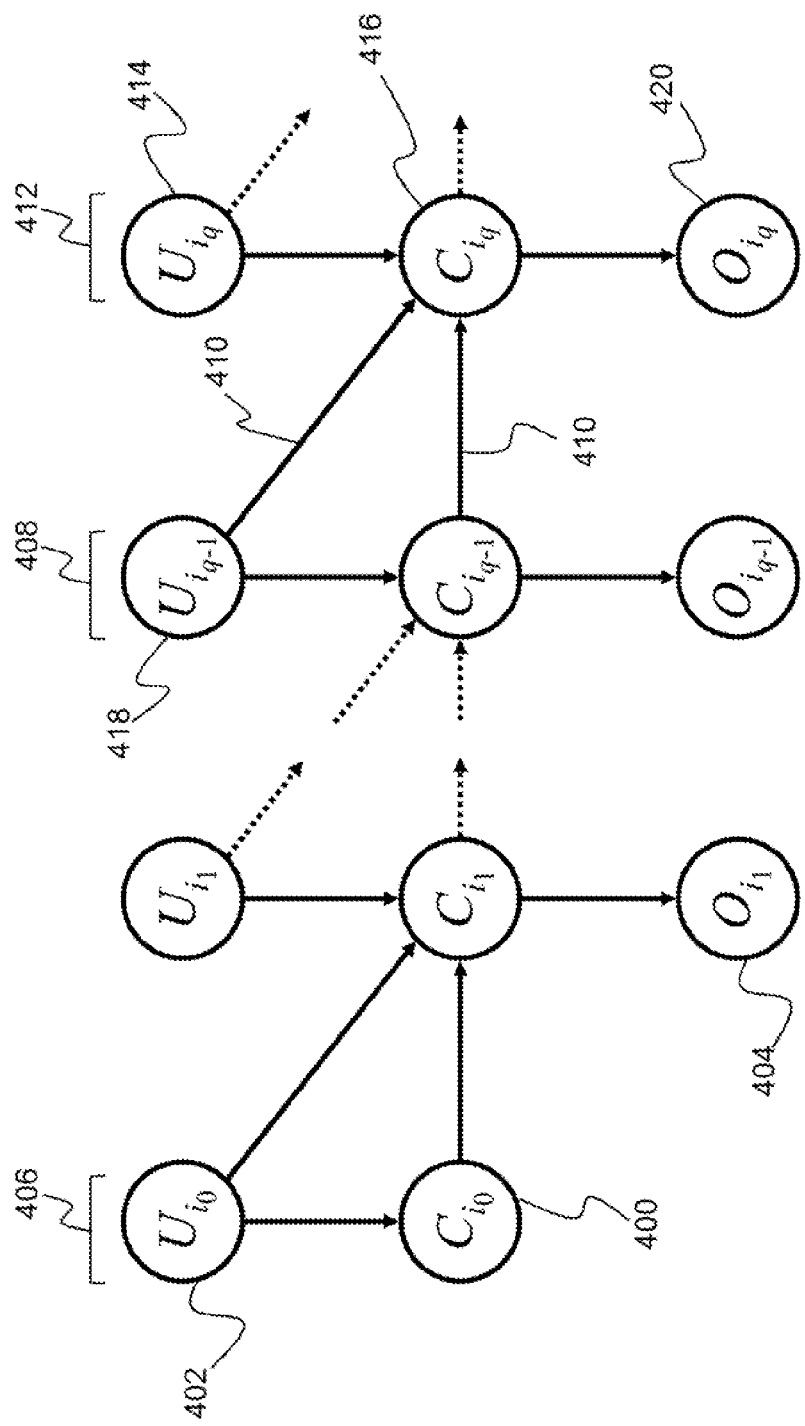
FIG. 4 illustrates a graphical model of a dynamic Bayesian network for a single component with one usage and one health observation according to the present invention.

FIG. 4 illustrates a graphical model of a structured, dynamic Bayesian network (BN) according to the present invention. For clarity, the model illustrates a simple example of health prognosis for a single component with one usage observation and one health observation. To create a complete prognosis model for this case, the BN structure and the BN parameters need to be defined. The structure of the dynamic network presented herein captures explicitly the evolution of a component's state of health and its health observations with advancing usage. The set of C (component) nodes 400 represent the instances of the component, the set of nodes U (usage) 402 represent instances of the usage, and the set of nodes O (observation) 404 represent instances of the health observations. The component nodes 400 have two states: defective and OK. Furthermore, the usage nodes 402 have a state for each usage bin. The health observation nodes 404 have a state for each health bin in the histograms of FIG. 1 and FIG. 2, respectively.

In a static implementation of the BN, the number of instances (i.e., slices in the graph) is at most equal to one plus the number of usage bins in the histogram of FIG. 2. For large histograms (i.e., those larger than twenty usage bins), it may be more appropriate to set the network size based on health observations. The network implicitly trends on health observations. Thus, the maximal number of health observations necessary for effective trending of the observation value may be used to set the network size provided it is much smaller than the number of usage bins.

In dynamic implementations of the BN, as described in the present application, there is no need to specify the number of graph slices. However, dynamic BN reasoning typically requires special reasoning engines, a non-limiting example of which includes GeNIe. GeNIe is produced by researchers at the University of Pittsburgh, located at Pittsburgh, Pa., 15260, and Samlam, produced by researchers at the University of California, Los Angeles, located at Los Angeles, Calif., 90095.

To introduce the novel algorithm for the derivation of BN parameters for the structured prognosis BN, a simple prognosis example is used. First, assume that prior probability distribution over the states of the usage node is uniform (i.e., for n bins, the value is 1/n for each state). Then, a conditional probability table for the component node is derived using a usage histogram 200 similar to the one illustrated in FIG. 2. Additionally, a conditional probability table for the health observation node is derived from a health observation histogram 300 similar to the one illustrated in FIG. 3. The details of the derivations will be presented below.

The results for the simple prognosis system can be easily generalized to other cases that may be encountered in practice. A system with two or more observations for the same component will have appropriately more health observation nodes. The parameters for each of these nodes can be obtained from the pertinent health observation histograms as described above. A system with multiple components, which may share observations, will have additional component nodes with parameters derived from the pertinent usage histograms. To model health observations, "noisy" nodes are used. Non-limiting examples of such "noisy" nodes include Noisy Or, Noisy Max and Noisy Adder. As can be appreciated by one skilled in the art, Noisy Or, Noisy Max, and Noisy Adder are described in the literature on BN. The parameters for shared observations are simple to derive if it is assumed that the nodes representing the observation are of the Noisy-Or type instead of a general chance node.

An extension to the case of multiple usage variables for a single component is more involved and requires generalization of the single usage model in FIG. 4 to a two-dimensional mesh. The additional usage variables may improve fidelity of the model, but at a prohibitively high cost in terms of the required data collection. The data would be needed not only in the presently described approach to prognosis, but in any other accurate method of implementing prognosis.

In the present invention, a set of formulae needed for BN model derivation is embedded in a model editor. A user inputs into the editor only the basic domain information, non-limiting examples of which include names and states of the components; names and states of the usage variables; names and states of the health observations; links between them (i.e., usage to component and component to health observation); and the histogram data. Then, the editor automatically converts the information into the final BN model using the formulae which will be described in detail in the next section. As a non-limiting example, a Bayesian model editor was described by K. W. Przytula, D. Dash, and D. Thompson, in "Evaluation of Bayesian Networks under Diagnostics," Proceedings of the 2003 IEEE Aerospace Conference, 2003, and by K. W. Przytula, G. Isdale, and T. C. Lu, in "Collaborative Development of Large Bayesian Networks," both of which are incorporated by reference as though fully set forth herein. Implementation of the Bayesian model editor would require only small modifications for use with the present invention.

(3.2) Application of the Model in Prognosis

To derive health prognosis for system components at some future level of usage, the following is required: a BN model of the system; past values of the usage and matching past health observations; present usage and health observations; and future usage. A reasoning engine takes the items as inputs and produces probability of components' failure. The results are computed using probabilistic reasoning on the BN model and the data. There are two categories of engines that may be used: static engines and dynamic engines.

A static engine, computes the output in a single step, taking in all the present and past information at once and, given future usage, producing a component health prognosis for the future. The static engine uses a static (i.e., fully expanded form) of the model illustrated in FIG. 4. There are a number of commercial and research static engines available to accomplish the task, non-limiting examples of which include Netica and Hugin. Hugin is produced by Hugin Expert, located at Gasvaerksvej 5, 9000 Aalborg, Denmark. Netica is produced by Norsys Software Corp, located at 3512 West 23rd Avenue, Vancouver, British Columbia, Canada, V6S 1K5.

Figure 5:
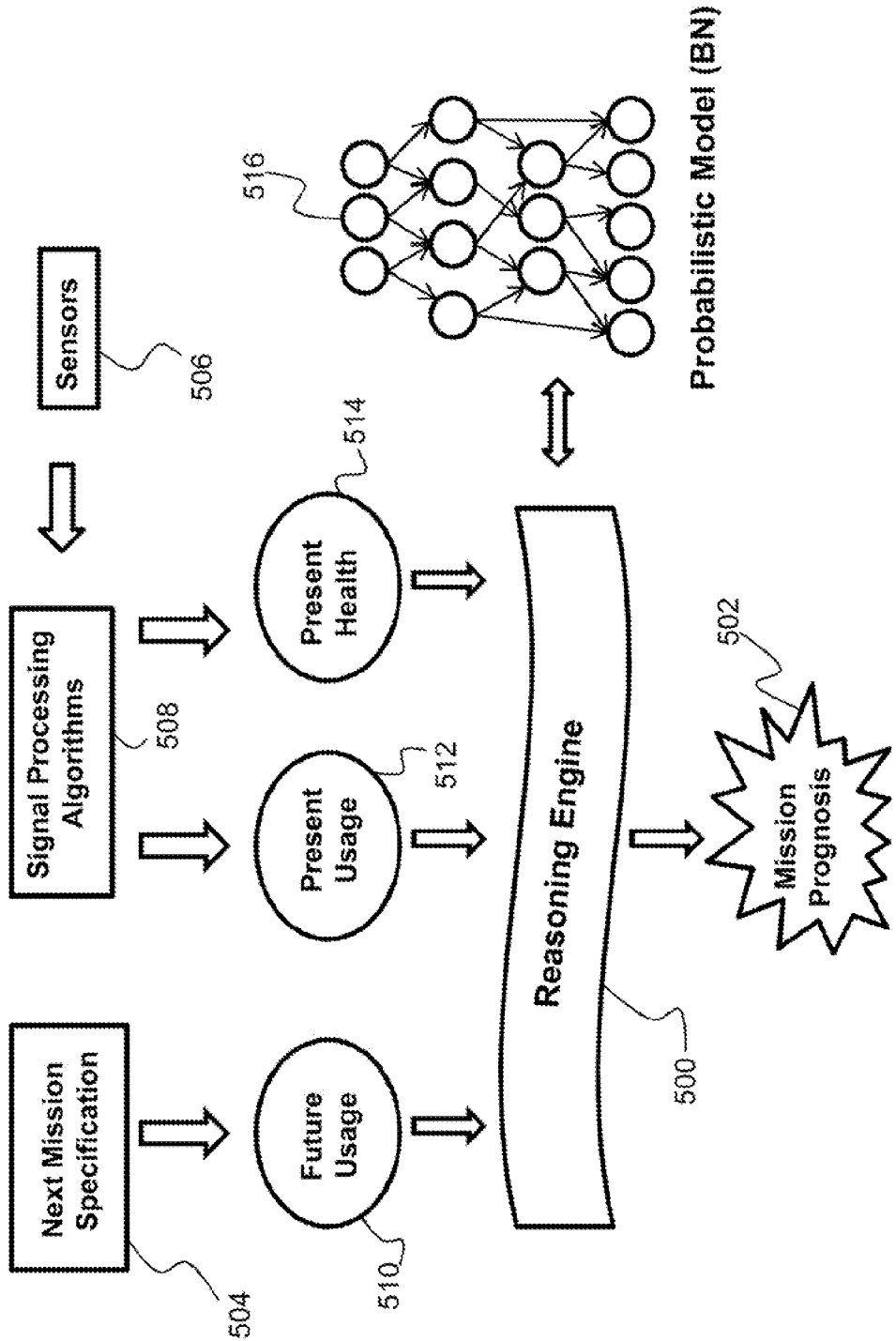
FIG. 5 is a model of implementation of prognosis using a Bayesian network and dynamic reasoning engine according to the present invention.

A dynamic engine processes new usage values and new observations as they arrive (i.e., iteratively). As illustrated in FIG. 5, a dynamic reasoning engine 500 updates the future health prognosis, or mission prognosis 502, at each iteration. The dynamic reasoning engine 500 requires only the definition of two slices of the network structure. Several research engines exist that support dynamic BN, a non-limiting example of which includes GeNIe. In a framework for diagnosis and prognosis, there may be several sources of evidence (i.e., a usage and maintenance database, a next mission specification, and the diagnosed system itself). FIG. 5 depicts the evidence source being a next mission specification 504. The specification for next mission 504 comes from the user of the prognosis recommendations. The mission specification indicates how much future use is expected of the system components during the mission. Built-in sensors 506 or external test devices provide evidence regarding the present health of the system and its health history which is processed by signal processing algorithms 508. The reasoning engine 500 computes prognosis 502 using information regarding present usage 510, present health observations 512, and future usage 514 of a component, as well as a BN model 516 of the system as inputs.

(3.3) Construction of a Bayesian Network for Diagnosis and Prognosis

Constructing a Bayesian network for diagnosis and prognosis according to the present invention includes the following operations. First, component failure data is collected. The data can be obtained from a variety of sources, non-limiting examples of which include manufacturer's specifications, test-bench experiments, simulations, and field data. Then, normalized histograms of failures are created. The failure histograms include bins corresponding to n component usages $u_1, \ldots, u_n$ and m health observation states $o_1, \ldots, o_m$. The component usage histogram induces a component failure density $\{fu_i\}_{i=1}^{n}$, whereas the health observation histogram induces an observation failure density $\{fo_k\}_{k=1}^{m}$. Hence, $fu_i$ and $fo_k$ are the histogram values for bins $u_i$ and $o_k$, respectively.

Next, component and observation failure densities are used to compute parameters for the dynamic Bayesian network (DBN). Consider FIG. 4, which highlights the structure of a DBN for a single component 400 with a single observation 404. The structure of a DBN represents a sequence of substructures, which are referred to as slices. There exists an initial slice, and a finite set of slices with identical substructure. Each slice is connected to the next, with the same set of directed edges. To define the structure of a DBN, it is necessary to define the structure of the initial slice, the repeated structure of the remaining slices, and the directed edges connecting one slice to the next. In FIG. 4, the first column $i_0$ 406 provides the structure for the initial slice, the column $i_{q-1}$ 408 provides the structure for the remaining slices, and the directed edges 410 to slice $i_q$ 412 provides the inter-slice dependencies.

Observe that there are three types of nodes illustrated in FIG. 4. Usage nodes $U_{i_q}$ 414 take on usage values $u_0, u_1, \ldots, u_n$. That is, $i_q$ is some usage bin from 0 to n, and, thus, each slice $i_q$ denotes some usage $u_{i_q}$. Here, $u_0$ is a special usage value denoting component birth, whereas the values $u_1, \ldots, u_n$ simply correspond to usage histogram bins. The assignment $U_{i_q} = u_{i_q}$ selects a specific context for slice $i_q$.

Nodes $C_{i_q}$ 416 represent the health of the component at usage $u_{i_q}$, where each $C_{i_q}$ 416 takes on two states: $c_{def}$ and $c_{ok}$. The value assignment $C_{i_q} = c_{def}$ denotes the event that the component is defective at usage $u_{i_q}$, and $C_{i_q} = c_{ok}$ denotes the event that the component is healthy at usage $u_{i_q}$. Each component $C_{i_q}$ 416 depends on its corresponding usage node $U_{i_q}$ 414 and the node $U_{i_{q-1}}$ 418 from the previous slice, if available.

Nodes $O_{i_q}$ 420 take on health observation values $o_1, \ldots, o_n$, where each $O_{i_q}$ 420 represents a health observation at usage $u_{i_q}$. Each observation $O_{i_q}$ 420 depends only on the health of the component $C_{i_q}$ 416. At most, there are n+1 slices which include an initial slice $i_0$ 406 and n additional slices $i_q$ 412 for each usage value $u_{i_q}$. Assume that slices are assigned unique usage values, and, furthermore, that the usage selected for slice $i_q$ 412 is greater that the usage for the slice $i_{q-1}$ 408. Thus, the full set of usage assignments $(U_{i_0}, U_{i_1}, \ldots, U_{i_n}) = (u_{i_0}, u_{i_1}, \ldots, u_{i_n})$ over all slices is simply an assignment to the original set of usages $(U_{i_0}, U_{i_1}, \ldots, U_{i_n}) = (u_0, u_1, \ldots, u_n)$ over the histogram bins. Therefore, assume, at most, one health observation $o_k$ is made for each usage $u_{i_q}$.

(3.4) Parameterization of the Dynamic Bayesian Network (DBN)

After the structure of the DBN has been specified, the parameters (i.e., the conditional probability tables) for each of the variables need to be specified. Since it is assumed that each usage node $U_{i_q}$ will be fixed to some value $u_{i_q}$ during reasoning, the choice of parameters is arbitrary. Hence, uniform prior distributions are assumed. Next, the parameters for component nodes $C_{i_q}$ are specified, which shall be defined using the failure density $\{fu_i\}_{i=1}^n$ from a usage histogram. The initial slice $i_0$ denotes the usage corresponding to the latest usage where the component is known to be healthy. Thus, the following conditional probabilities are:

$$Pr(C_{i_0}=c_{ok}|U_{i_0}=u_{i_0})=1$$

$$Pr(C_{i_0}=c_{def}|U_{i_0}=u_{i_0})=0.$$

where the component is healthy at usage $u_{i_0}$. For a slice $i_q > i_0$, given that the component is healthy at the previous usage $u_{i_{q-1}}$, the conditional probability for the node $C_{i_q}$ is the following:

$$Pr(C_{i_q}=c_{def} | C_{i_{q-1}}=c_{ok}, U_{i_{q-1}}=u_{i_{q-1}}, U_{i_q}=u_{i_q}) = \frac{\sum_{k=i_{q-1}+1}^{i_q} fu_k}{\sum_{k=i_{q-1}+1}^{n} fu_k},$$

which is computed using values from the histogram bins. The probability for the case $C_{i_q}=c_{ok}$ is simply one minus the above.

When the component is not healthy at the previous usage $u_{i_{q-1}}$, the conditional probability for the node $C_{i_q}$ is the following:

$$Pr(C_{i_q}=c_{def}|C_{i_{q-1}}=c_{def}, U_{i_{q-1}}=u_{i_{q-1}}, U_{i_q}=u_{i_q})=1.$$

Thus, once a component becomes defective at some past usage, it stays defective for all future usages. Similarly, the probability for the case $C_{i_q}=c_{ok}$ is simply zero.

Finally, the parameters for the observation node $O_{i_q}$ need to be specified, which is defined using the failure density $\{fo_k\}_{k=1}^m$ from an observation histogram. The conditional probabilities are the following:

$$Pr(O_{i_q}=o_k|C_{i_q}=c_{def})=fo_k; \text{ and}$$

$$Pr(O_{i_q}=o_k|C_{i_q}=c_{ok})=\alpha Ro_{k+1},$$

where $R_{o_{k+1}}=\sum_{l=k+1}^m fo_l$ is a reliability of the observation at state $o_k$, and where $R_{o_{m+1}}=0$. Finally, $\alpha=(\sum_{k=1}^m Ro_{k+1})^{-1}$, which is a normalizing constant.

After the DBN has been constructed, it is used with the reasoning engine in order to compute diagnoses and prognoses. First, the latest usage $u_{i_o}$ in which the component is known to be healthy is identified. Then, a history of health observations $(O_{i_1}, \ldots, O_{i_q}) = (o_{i_1}, \ldots, o_{i_q})$ with a corresponding set of usages $(U_{i_1}, \ldots, U_{i_q}) = (u_{i_1}, \ldots, u_{i_q})$ is collected. The corresponding set of usages identify when the observations were made. Next, a present usage $u_j$, where $j > i_q$, and a present observation is selected for node $O_j$. For a diagnosis, the marginal probability of component $C_j$ given all assignments, present and preceding, is computed. Thereafter, a future usage $u_k$, where $k > j$ is selected. Finally, for a prognosis, the marginal probability over component $C_k$ given all of the preceding assignments is computed.

Figure 6:
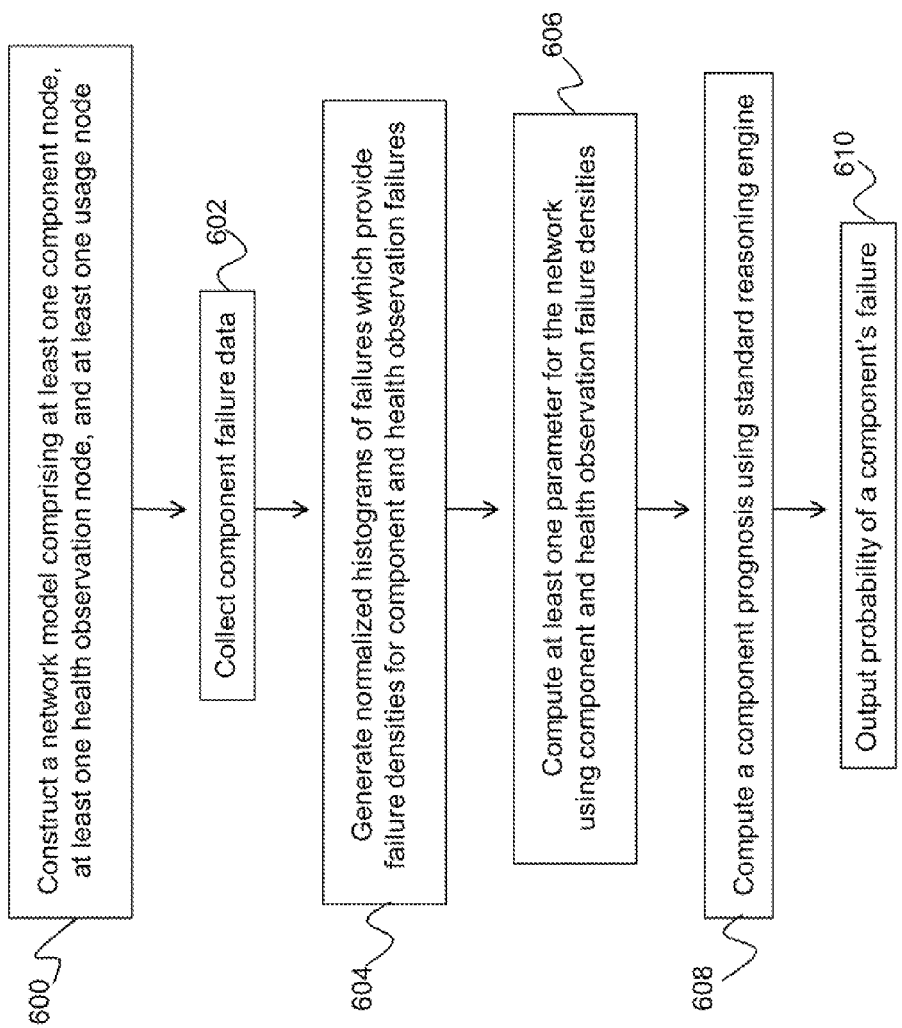
FIG. 6 illustrates an overview of steps involved in development of a graphical probabilistic model and its application in a system for health prognosis of a component according to the present invention.

FIG. 6 illustrates a concept overview of a system for health prognosis of a component according to the present invention. As described in detail above, a network model having at least one component node, at least one health observation node, and at least one usage node is constructed 600. Component failure data is collected 602, and normalized histograms of failures are generated to provide failure densities for component and health observation failures 604. Then, parameters for the network are computed with conditional probabilities based on component and health observation failure densities 606. A standard reasoning engine computes a component prognosis 608 (i.e. probability of a component's failure), and prognosis is output 610 to a user.

Figure 7:
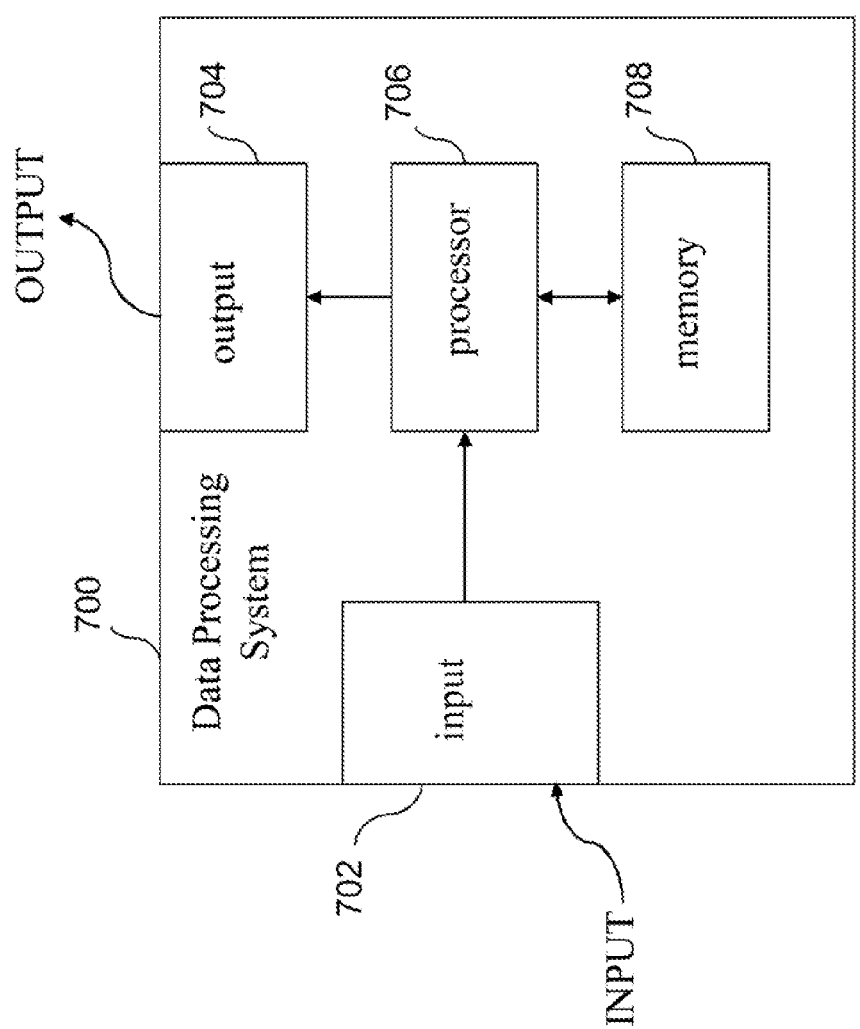
FIG. 7 is an illustration of a data processing system according to the present invention.

FIG. 7 illustrates a block diagram depicting components of a data processing system 700 (e.g., computer) incorporating the operations of the method described above. The method utilizes a data processing system 700 for storing computer executable instruction means for causing a processor (or processors) to carry out the operations of the above described method. The data processing system 700 comprises an input 702 for receiving information from a user. Information received may include input from devices such as cameras, scanners, keypads, keyboards, microphone, other peripherals such as storage devices, other programs, etc. The input 702 may include multiple "ports." An output 704 is connected with a processor 706 for providing information for transmission to other data processing systems, to storage devices, to display devices such as monitors, to generating information necessary for delivery, and to other mechanisms for presentation in user-usable forms. The input 702 and the output 704 are both coupled with the processor 706 (or processors), which may be a general-purpose computer processor or a specialized processor designed specifically for use with the present invention. The processor 706 is coupled with a memory 708 to permit storage of data and software to be manipulated by commands to the processor 706.

Figure 8:
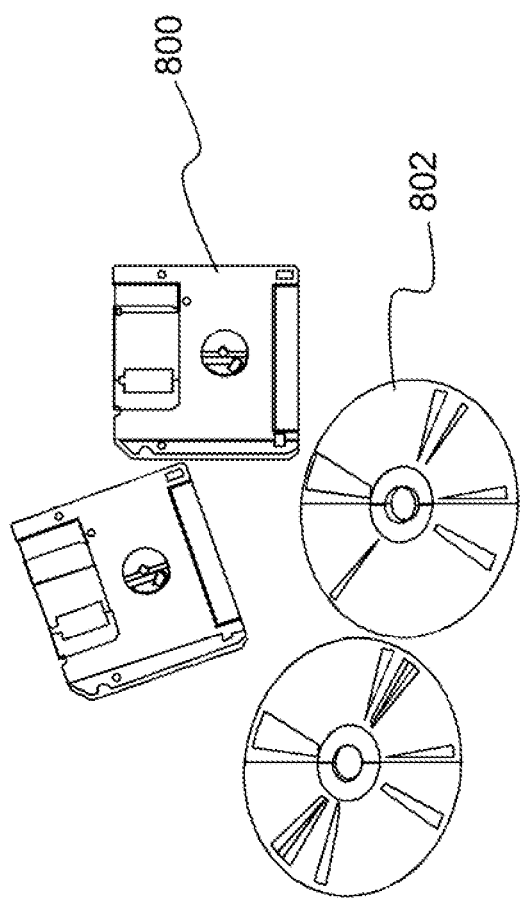
FIG. 8 is an illustration of a computer program product according to the present invention.

An illustrative diagram of a computer program product embodying the present invention is depicted in FIG. 8. As a non-limiting example, the computer program product is depicted as either a floppy disk 800 or an optical disk 802. However, as mentioned previously, the computer program product generally represents computer readable code stored on any compatible computer readable medium.

What is claimed is:

1. A system for health prognosis of component using a graphical probabilistic model, the system comprising one or more processors that are specifically configured to perform operations of:
   utilizing a graphical probabilistic model formed of:
      a first layer having at least one component node representing the health of at least one component;
      a second layer having at least one health observation node representing at least one health observation; and
      a third layer having at least one usage node representing at least one usage observation;
   collecting component failure data;
   generating normalized histograms of failures with a set of usage bins and a set of health bins, wherein the histograms provide failure densities for at least one component failure and at least one health observation failure;
   computing at least one parameter for the graphical probabilistic model using component and health observation failure densities;
   computing a component health prognosis using a reasoning engine; and
   outputting a component health prognosis.

2. The system for health prognosis of a component as set forth in claim 1, wherein the third layer is connected with the first layer, the second layer is connected with the first layer, and wherein nodes in different layers are connected to one another through causal links.

3. The system for health prognosis of a component as set forth in claim 2, wherein each component node has a defective state and an OK state, each usage node has a state for each usage bin, and each health observation node has a state for each health bin.

4. The system for health prognosis of a component as set forth in claim 3, wherein the usage bins correspond to n component usages $u_1, \ldots, u_n$, and the health bins correspond to m health observation states $o_1, \ldots, o_m$, wherein a component usage histogram induces a failure density $\{fu_i\}_{i=1}^{n}$, and a health observation histogram induces a failure density $\{fo_k\}_{k=1}^{m}$, such that $fu_i$ and $fo_k$ are histogram values for bins $u_i$ and $o_k$, respectively.

5. The system for health prognosis of a component as set forth in claim 4, wherein a set of usage nodes $U_{i_q}$ take on a set of usage values $u_0, u_1, \ldots, u_n$, such that $i_q$ is some usage bin from 0 to n; and
   wherein a set of component nodes $C_{i_q}$ represents the health of the component at usage $u_{i_q}$, where each $C_{i_q}$ has two states $c_{def}$ and $c_{ok}$, such that a value assignment $C_{i_q}=c_{def}$ denotes an event that the component is defective at a usage $u_{i_q}$ and $C_{i_q}=c_{ok}$ denotes an event that the component is healthy at usage $u_{i_q}$; and
   wherein a set of health observation nodes $O_{i_q}$ take on a set of health observation values $o_1, \ldots, o_n$, where each $O_{i_q}$ represents a health observation at usage $u_{i_q}$.

6. The system for health prognosis of a component as set forth in claim 5, wherein in the operation of computing at least one parameter for the model, the system is further configured to perform operations of:
   assuming that each usage node $U_{i_q}$ will be fixed to some value $u_{i_q}$ during reasoning, where a prior probability distribution over the states of the usage nodes is uniform;
   specifying a set of parameters for the set of component nodes $C_{i_q}$, wherein the parameters are defined using the failure density $\{fu_i\}_{i=1}^{n}$ from the component usage histogram according to the following:

$$Pr(C_{i_0}=c_{ok}|U_{i_0}=u_{i_0})=1$$

$$Pr(C_{i_0}=c_{def}|U_{i_0}=u_{i_0})=0,$$

where Pr denotes a probability distribution, | denotes a conditional probability, and where $i_o$ denotes a usage corresponding to a latest usage where the component is known to be healthy;
computing a set of conditional probabilities for a set of component nodes $C_{i_q}$ using values obtained from the histogram bins according to the following:

$$Pr\left(C_{i_q} = c_{def} \mid C_{i_{q-1}} = c_{ok}, U_{i_{q-1}} = u_{i_{q-1}}, U_{i_q} = u_{i_q}\right) = \frac{\sum_{k=i_{q-1}+1}^{i_q} fu_k}{\sum_{k=i_{q-1}+1}^{n} fu_k},$$

given that the component is healthy at usage $u_{i_{q-1}}$; and
specifying a set of parameters for a set of health observation nodes $O_{i_q}$, wherein the parameters are defined using the failure density $\{fo_k\}_{k=1}^{m}$ from the health observation histogram according to the following conditional probabilities:

$$Pr(O_{i_q}=o_k|C_{i_q}=c_{def})=fo_k; \text{ and}$$

$$Pr(O_{i_q}=o_k|C_{i_q}=c_{ok})=\alpha Ro_{k+1},$$

where $Ro_{k+1}=\sum_{l=k+1}^{m} fo_l$ is a reliability of the observation at state $o_k$, where $Ro_{m+1}=0$, and where $\alpha=(\sum_{k=1}^{m} Ro_{k+1})^{-1}$ is a normalizing constant.

7. The system for health prognosis of a component as set forth in claim 6, wherein in the operation of computing a component prognosis using a reasoning engine, the system is further configured to perform operations of:
   identifying a latest usage $u_{i_q}$ in which the component is known to be healthy;
   collecting a history of health observations $(O_{i_1}, \ldots, O_{i_q})= (o_{i_1}, \ldots, o_{i_q})$ with a corresponding set of usages $(U_{i_1}, \ldots, U_{i_q})=(u_{i_1}, \ldots, u_{i_q})$ that identify when the observations were made;
   selecting a present usage $u_j$, where $j>i_q$ and a present observation for node $O_j$;
   computing a marginal probability of component $C_j$, given all assignments for a diagnosis;
   selecting a future usage $u_k$, where $k>j$; and
   computing a marginal probability over component $C_k$, given preceding assignments for a prognosis.

8. A computer implemented method for health prognosis of a component, the method comprising an act of causing a processor to perform operations of:
utilizing a graphical probabilistic model formed of:
a first layer having at least one component node representing the health of at least one component;
a second layer having at least one health observation node representing at least one health observation; and
a third layer having at least one usage node representing at least one usage observation;
collecting component failure data;
generating normalized histograms of failures with a set of usage bins and a set of health bins, wherein the histograms provide failure densities for at least one component failure and at least one health observation failure;
computing at least one parameter for the graphical probabilistic model using component and health observation failure densities;
computing a health component prognosis using a reasoning engine; and
outputting a health component prognosis.

9. The method for health prognosis of a component as set forth in claim 8, wherein the third layer is connected with the first layer, the second layer is connected with the first layer, and wherein nodes in different layers are connected to one another through causal links.

10. The method for health prognosis of a component as set forth in claim 9, wherein each component node has a defective state and an OK state, each usage node has a state for each usage bin, and each health observation node has a state for each health bin.

11. The method for health prognosis of a component as set forth in claim 10, wherein the usage bins correspond to n component usages $u_1, \ldots, u_n$, and the health bins correspond to m health observation states $o_1, \ldots, o_m$, wherein a component usage histogram induces a failure density $\{fu_i\}_{i=1}^{n}$, and a health observation histogram induces a failure density $\{fo_k\}_{k=1}^{m}$, such that $fu_i$ and $fo_k$ are histogram values for bins $u_i$ and $o_k$, respectively.

12. The method for health prognosis of a component as set forth in claim 11, wherein a set of usage nodes $U_{i_q}$ take on a set of usage values $u_0, u_1, \ldots, u_n$, such that $i_q$ is some usage bin from 0 to n; and
wherein a set of component nodes $C_{i_q}$ represents the health of the component at usage $u_{i_q}$, where each $C_{i_q}$ has two states $c_{def}$ and $c_{ok}$, such that a value assignment $C_{i_q}=c_{def}$ denotes an event that the component is defective at a usage $u_{i_q}$ and $C_{i_q}=c_{ok}$ denotes an event that the component is healthy at usage $u_{i_q}$; and
wherein a set of health observation nodes $O_{i_q}$ take on a set of health observation values $o_1, \ldots, o_n$, where each $O_{i_q}$ represents a health observation at usage $u_{i_q}$.

13. The method for health prognosis of a component as set forth in claim 12, wherein in the operation of computing at least one parameter for the model, the system is further configured to perform operations of:
assuming that each usage node $U_{i_q}$ will be fixed to some value $u_{i_q}$ during reasoning, where a prior probability distribution over the states of the usage nodes is uniform;
specifying a set of parameters for the set of component nodes $C_{i_q}$, wherein the parameters are defined using the failure density $\{fu_i\}_{i=1}^{n}$ from the component usage histogram according to the following:

$Pr(C_{i_0}=c_{ok}|U_{i_0}=u_{i_0})=1$ $Pr(C_{i_0}=c_{def}|U_{i_0}=u_{i_0})=0$, where Pr denotes a probability distribution, | denotes a conditional probability, and where $i_o$ denotes a usage corresponding to a latest usage where the component is known to be healthy;
computing a set of conditional probabilities for a set of component nodes $C_{i_q}$ using values obtained from the histogram bins according to the following:

$$Pr(C_{i_q}=c_{def} \mid C_{i_{q-1}}=c_{ok}, U_{i_{q-1}}=u_{i_{q-1}}, U_{i_q}=u_{i_q}) = \frac{\sum_{k=i_{q-1}+1}^{i_q} fu_k}{\sum_{k=i_{q-1}+1}^{n} fu_k},$$

given that the component is healthy at usage $u_{i_{q-1}}$; and
specifying a set of parameters for a set of health observation nodes $O_{i_q}$, wherein the parameters are defined using the failure density $\{fo_k\}_{k=1}^{m}$ from the health observation histogram according to the following conditional probabilities:

$Pr(O_{i_q}=o_k|C_{i_q}=c_{def})=fo_k$; and $Pr(O_{i_q}=o_k|C_{i_q}=c_{ok})=\alpha Ro_{k+1}$, where $Ro_{k+1}=\Sigma_{l=k+1}^{m} fo_l$ is a reliability of the observation at state $o_k$, where $Ro_{m+1}=0$, and where $\alpha=(\Sigma_{k=1}^{m} Ro_{k+1})^{-1}$ is a normalizing constant.

14. The method for health prognosis of a component as set forth in claim 13, wherein in the operation of computing a component prognosis using a reasoning engine, the system is further configured to perform operations of:
identifying a latest usage $u_{i_q}$ in which the component is known to be healthy;
collecting a history of health observations $(O_{i_1}, \ldots, O_{i_q})=(o_{i_1}, \ldots, o_{i_q})$ with a corresponding set of usage $(U_{i_1}, \ldots, U_{i_q})=(u_{i_1}, \ldots, u_{i_q})$ that identify when the observations were made;
selecting a present usage $u_j$, where $j>i_q$ and a present observation for node $O_j$;
computing a marginal probability of component $C_j$, given all assignments for a diagnosis;
selecting a future usage $u_k$, where $k>j$; and
computing a marginal probability over component $C_k$, given preceding assignments for a prognosis.

15. A computer program product for health prognosis of a component, the computer program product comprising computer-readable instruction means stored on a non-transitory computer-readable medium that are executable by a computer having a processor for causing the processor to perform operations of:
utilizing a graphical probabilistic model formed of:
a first layer having at least one component node representing the health of at least one component;
a second layer having at least one health observation node representing at least one health observation; and
a third layer having at least one usage node representing at least one usage observation;
collecting component failure data;
generating normalized histograms of failures with a set of usage bins and a set of health bins, wherein the histograms provide failure densities for at least one component failure and at least one health observation failure;
computing at least one parameter for the graphic probabilistic model using component and health observation failure densities;

computing a component health prognosis using a reasoning engine; and outputting a component health prognosis.

16. The computer program product for health prognosis of a component as set forth in claim 15, wherein the third layer is connected with the first layer, the second layer is connected with the first layer, and wherein nodes in different layers are connected to one another through causal links.

17. The computer program product for health prognosis of a component as set forth in claim 16, wherein each component node has a defective state and an OK state, each usage node has a state for each usage bin, and each health observation node has a state for each health bin.

18. The computer program product for health prognosis of a component as set forth in claim 17, wherein the usage bins correspond to n component usages $u_1, \ldots, u_n$, and the health bins correspond to m health observation states $o_1, \ldots, o_m$, wherein a component usage histogram induces a failure density $\{fu_i\}_{i=1}^n$, and a health observation histogram induces a failure density $\{fo_k\}_{k=1}^m$, such that $fu_i$ and $fo_k$ are histogram values for bins $u_i$ and $o_k$, respectively.

19. The computer program product for health prognosis of a component as set forth in claim 18, wherein a set of usage nodes $U_{i_q}$ take on a set of usage values $u_0, u_1, \ldots, u_n$, such that $i_q$ is some usage bin from 0 to n; and wherein a set of component nodes $C_{i_q}$ represents the health of the component at usage $u_{i_q}$, where each $C_{i_q}$ has two states $c_{def}$ and $c_{ok}$, such that a value assignment $C_{i_q}=c_{def}$ denotes an event that the component is defective at a usage $u_{i_q}$ and $C_{i_q}=c_{ok}$ denotes an event that the component is healthy at usage $u_{i_q}$; and wherein a set of health observation nodes $O_{i_q}$ take on a set of health observation values $o_1, \ldots, o_n$, where each $O_j$ represents a health observation at usage $u_{i_q}$.

20. The computer program product for health prognosis of a component as set forth in claim 19, wherein in the operation of computing at least one parameter for the model, the system is further configured to perform operations of:

assuming that each usage node $U_{i_q}$ will be fixed to some value $u_{i_q}$ during reasoning, where a prior probability distribution over the states of the usage nodes is uniform;

specifying a set of parameters for the set of component nodes $C_{i_q}$, wherein the parameters are defined using the failure density $\{fu_i\}_{i=1}^n$ from the component usage histogram according to the following:

$Pr(C_{i_0}=c_{ok}|U_{i_0}=u_{i_0})=1$ $Pr(C_{i_0}=c_{def}|U_{i_0}=u_{i_0})=0$, where Pr denotes a probability distribution, | denotes a conditional probability, and where $i_o$ denotes a usage corresponding to a latest usage where the component is known to be healthy;

computing a set of conditional probabilities for a set of component nodes $C_{i_q}$ using values obtained from the histogram bins according to the following:

$$Pr(C_{i_q}=c_{def} \mid C_{i_{q-1}}=c_{ok}, U_{i_{q-1}}=u_{i_{q-1}}, U_{i_q}=u_{i_q}) = \frac{\sum_{k=i_{q-1}+1}^{i_q} fu_k}{\sum_{k=i_{q-1}+1}^{n} fu_k},$$

given that the component is healthy at usage $u_{i_{q-1}}$; and specifying a set of parameters for a set of health observation nodes $O_{i_q}$, wherein the parameters are defined using the failure density $\{fo_k\}_{k=1}^m$ from the health observation histogram according to the following conditional probabilities:

$Pr(O_{i_q}=o_k|C_{i_q}=c_{def})=fo_k$; and $Pr(O_{i_q}=o_k|C_{i_q}=c_{ok})=\alpha Ro_{k+1}$, where $Ro_{k+1}=\sum_{l=k+1}^{m} fo_l$ is a reliability of the observation at state $o_k$, where $Ro_{m+1}=0$, and where $\alpha=(\sum_{k=1}^{m} Ro_{k+1})^{-1}$ is a normalizing constant.

21. The computer program product for health prognosis of a component as set forth in claim 20, wherein in the operation of computing a component prognosis using a reasoning engine, the system is further configured to perform operations of:

identifying a latest usage $u_{i_q}$ in which the component is known to be healthy;

collecting a history of health observations $(O_{i_1}, \ldots, O_{i_q})=(o_{i_1}, \ldots, o_{i_q})$ with a corresponding set of usages $(U_{i_1}, \ldots, U_{i_q})=(u_{i_1}, \ldots, u_{i_q})$ that identify when the observations were made;

selecting a present usage $u_j$, where $j>i_q$ and a present observation for node $O_j$;

computing a marginal probability of component $C_j$, given all assignments for a diagnosis;

selecting a future usage $u_k$, where $k>j$; and computing a marginal probability over component $C_k$, given preceding assignments for a prognosis.

* * * * *